(12) United States Patent
Arnold et al.

(10) Patent No.: US 9,639,436 B2
(45) Date of Patent: May 2, 2017

(54) SYNCHRONOUS REPLICATION ERROR DETECTION AND HANDLING

(71) Applicant: Dell Products, LP, Round Rock, TX (US)

(72) Inventors: Howard Ernest Arnold, Londonderry, NH (US); Jill Leslie Manfield, Merrimack, NH (US)

(73) Assignee: Dell Products, LP, Round Rock, TX (US)

( * ) Notice: Subject to any disclaimer, the term of this patent is extended or adjusted under 35 U.S.C. 154(b) by 136 days.

(21) Appl. No.: 14/608,921

(22) Filed: Jan. 29, 2015

(65) Prior Publication Data
US 2016/0224441 A1    Aug. 4, 2016

(51) Int. Cl.
*G06F 11/00*   (2006.01)
*G06F 11/16*   (2006.01)
*G06F 11/30*   (2006.01)
*G06F 11/34*   (2006.01)

(52) U.S. Cl.
CPC ...... *G06F 11/1662* (2013.01); *G06F 11/3034* (2013.01); *G06F 11/3466* (2013.01)

(58) Field of Classification Search
CPC ............. G06F 11/1662; G06F 11/2053; G06F 11/2056; G06F 11/2064; G06F 11/2069; G06F 11/2071; G06F 11/2079; G06F 11/2082; G06F 11/2094
See application file for complete search history.

(56) References Cited

U.S. PATENT DOCUMENTS

| 6,223,252 B1* | 4/2001 | Bandera | G06F 11/2069 711/112 |
| 2003/0036882 A1* | 2/2003 | Harper | G06F 11/2035 702/186 |
| 2005/0060618 A1* | 3/2005 | Guha | G06F 11/008 714/54 |

(Continued)

OTHER PUBLICATIONS

Olander, Ray, Virtually Useful, Nimble Storage Array Info I, Dec. 2012. Retrieved from the Internet URL: http://virtuallyuseful.wordpress.com/2012/12/18/nimble-storage-arrays/.
(Continued)

*Primary Examiner* — Michael Maskulinski
(74) *Attorney, Agent, or Firm* — Hamilton, Brook, Smith & Reynolds, P.C.

(57) ABSTRACT

Some embodiments are directed to a method, corresponding system, and corresponding apparatus that may store data and may monitor, detect, and handle one or more warning or error indications within one or more synchronized replication volumes. Some embodiments may provide first and second storage pools of storage devices with respective volumes. In some embodiments, the first and second storage pools may not share the same controller. Some embodiments may synchronize the first and second storage pools by a storage device of the first storage pool. Some embodiments may monitor for failures, including but not limited to warnings, soft errors, and/or hard errors, at a storage device of the first storage pool. In some embodiments, the one or more failures may be invisible or inaccessible to a user. Prior to an out of sync event or failure, some embodiments may automatically replace the second volume with the first volume.

18 Claims, 10 Drawing Sheets

(56) References Cited

U.S. PATENT DOCUMENTS

| | | | | |
|---|---|---|---|---|
| 2005/0216800 A1* | 9/2005 | Bicknell | ............... | G06F 11/008 714/718 |
| 2006/0092847 A1* | 5/2006 | Mohan | ................ | H04L 12/2602 370/241.1 |
| 2006/0149900 A1* | 7/2006 | Terry | ................. | G06F 11/1662 711/114 |
| 2007/0214255 A1* | 9/2007 | Spitz | .................... | G06F 11/008 709/224 |
| 2009/0198949 A1* | 8/2009 | Kuligowski | .......... | G06F 3/0605 711/203 |
| 2014/0365822 A1* | 12/2014 | Tarves, Jr. | .......... | G06F 11/1469 714/15 |
| 2015/0082302 A1* | 3/2015 | Cheng | ................ | G06F 9/45533 718/1 |
| 2016/0170823 A1* | 6/2016 | Miller | ................ | G06F 11/0772 714/56 |

OTHER PUBLICATIONS

Dyer, Nick, Nimble Storage, Presenting a Customer Case Study at London VMUG, Jan. 2014. Retrieved from the Internet URL: http://www.nimblestorage.com/blog/customers/presenting-a-customer-case-study-at-london-vmug/.

Virtacore, Nimble Cloud Replication Service Launches, Jun. 2013. Retrieved from the Internet URL: http://www.virtacore.com/nimble-cloud-replication-service-launches/.

Wenjyu, Super Sonic Dog (S.S.D), Space Reclamation in vSphere 5.5 with Nimble Storage, Mar. 2014. Retrieved from the Internet URL: http://www.supersonicdog.com/2014/03/28/unmap/.

IBM, IBM XIV Storage System: Copy Services and Migration, Jan. 2011.

VMware vCenter Site Recovery Manager 5.5, Automated Disaster Recovery Orchestration, Nov. 2013. Retrieved from the Internet URL: http://www.vmware.com/files/pdf/products/SRM/VMware_vCenter_Site_Recovery_Manager_5.5.pdf.

vSphere Data Protection Administration Guide, vSphere Data Protection 5.1, Jun. 2012. Retrieved from the Internet URL: https://pubs.vmware.com/vsphere-51/topic/com.vmware.ICbase/PDF/vmware-data-protection-administration-guide-51.pdf.

Dell, Technical Report 1085, V1.0, Dell EqualLogic PS Series Array: Understanding Synchronous Replication (SyncRep), Aug. 2012.

$EMC^2$, White Paper, Implementing Local Replication Using EMC Timefinder and Recoverpoint and Coexistence of RP/CDP with SRDF on Symmetrix Vmax, Jul. 2013. Retrieved from the Internet URL: http://www.emc.com/collateral/white-papers/h8981-vmax10k-timefinder-recoverpt-local-repl-wp.pdf.

VMware Data Protection, Sep. 2013, Retrieved from the Internet URL: http://www.vmware.com/business-continuity/data-protection.

* cited by examiner

FIG. 2B-I

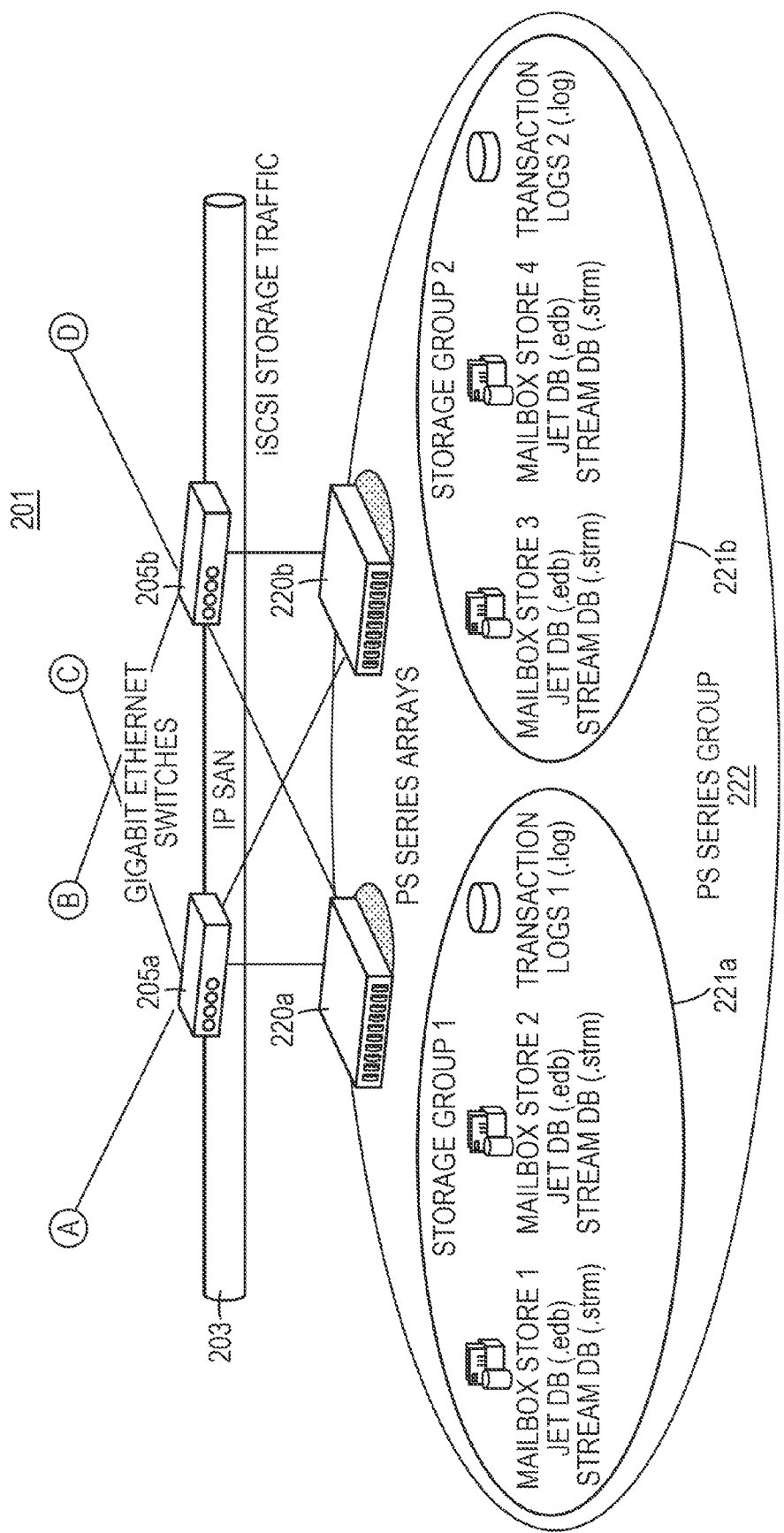
FIG. 2B-II

SYNCHRONOUS REPLICATION ERROR DETECTION AND HANDLING

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The increased use of technology and computers has generated a corresponding increase in digital data. This ever-increasing digital data requires a corresponding ever-increasing amount of storage space. The need for storage space for digital data has been fueled through many changes in society. For example, home computer users' increased storage of multimedia data, especially video and photographic data, has served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

With this increase of digital data, there has been a corresponding further reliance upon the integrity, required accessibility, and throughput of the digital data that is included in storage pools. Across the network (and/or locally), a storage pool may be synchronized to another storage pool, and the storage pool may have subtle but serious errors (and/or warnings) that may not be possible for a user to detect until after a volume failure occurs, which may adversely affect performance and/or integrity of the storage pool and/or devices on the network. Solutions are needed to address this deficiency in monitoring for and detecting errors in a pool of prior to a failure of volume (including but not limited to a failure of an entire volume).

Existing approaches fail to provide a solution for monitoring and detecting user-invisible errors in order to prevent synchronous replication volumes from getting out of sync. Some existing tools (see *IBM XIV Storage System: Copy Services and Migration, Draft Document for Review*, Jan. 23, 2011) monitor a storage array to determine an amount of disk space remaining, in order to prevent the array from running out of space, but not to prevent a synchronous replication volume from getting out of sync. Other existing tools, such as a Site Recovery Manager (see *VMWARE VCENTER Site Recovery Manager 5.8 Datasheet*, July 2014, hereinafter "SRM") and Data Protection Manager (see *VMWARE's VSPHERE Data Protection Administration Guide*, Version 5.1, June 2012, hereinafter "Data Protection Manager") also fail to provide such a solution.

SUMMARY OF THE DISCLOSURE

Thus, an efficient and reliable method, corresponding system, and corresponding apparatus is presented, which may store data and may monitor, detect and/or handle one or more warning (and/or error) indications within (and/or across) one or more synchronized replication pools (and/or volumes).

In some embodiments, a computer-implemented method begins by providing a first pool of storage having a first plurality of storage devices and an associated first volume. Some embodiments may provide a second pool of storage that may have a second plurality of storage devices and an associated second volume. In some embodiments, data of the first pool of storage may correspond to data of the second pool of storage. In some embodiments, the first pool of storage and the second pool of storage preferably may not share the same controller. Some embodiments may synchronize, by a storage device of the first plurality of storage devices, the first pool of storage with the second pool of storage. Some embodiments may monitor, at a storage device of the first plurality of storage devices, each given storage device of the first plurality of storage devices for one or more warning indications (including, but not limited to, hard errors, soft errors, and/or warnings, and/or failures detected from one or more event logs).

Some embodiments, based on results of the monitoring, may automatically take corrective action, prior to a loss of synchronization event and/or prior to a failure of the first volume. In some embodiments, automatically taking corrective action may include replacing the second volume with the first volume, prior to the loss of synchronization event and/or prior to the failure of the first volume.

Some embodiments, based on results of the monitoring, may detect one or more conditions and/or initiate the automatically taken corrective action based upon a predefined threshold associated with the one or more conditions. Some embodiments, based on results of the monitoring, may detect one or more conditions and initiate the automatically taken corrective action based upon a predefined threshold associated with the one or more conditions. In some embodiments, the one or more warning indications may be at least one of: invisible to a user and inaccessible to a user.

In some embodiments, the one or more warning indications may include at least one of: a lost block, a disk error, a port down, a network link error, and a hardware fault. In some embodiments, the one or more warning indications may include at least one of: a lost block, a disk error (including but not limited to logical block addressing, or LBA errors), a port down, a network link error, a network link error for an extended period of time, and/or a hardware fault including but not limited to a controller failover and/or power supply unit (PSU) failures. In some embodiments, the storage device of the first plurality of storage devices may monitor for one or more warning indications in one or more event logs that may be associated with each given storage device.

Some embodiments may automatically take corrective action, further including running a rescan on the second volume, mounting storage devices of the second volume, registering one or more virtual machines (VMs) of the second volume, and/or powering on one or more virtual machines (VMs) of the second volume.

Some embodiments may replace the second volume with the first volume, including configuring the second volume using at least one of: a different number of storage devices and a different arrangement of storage devices, as compared with the second volume, without loss of data from the first volume. In some embodiments, synchronizing may include performing one or more bi-directional acknowledgements between the first pool of storage and the second pool of storage.

Some embodiments may include an information handling system (IHS). Some embodiments of the IHS may comprise a data module configured to provide a first pool of storage having a first plurality of storage devices and an associated first volume. In some embodiments, the data module may be further configured to provide a second pool of storage having a second plurality of storage devices and an associated second volume. In some embodiments, data of the first pool of storage may correspond to data of the second pool of storage. In some embodiments, the first pool of storage and the second pool of storage preferably may not share the same controller.

Some embodiments of the IHS may include a computing module that may be configured to synchronize, by a storage device of the first plurality of storage devices, the first pool of storage with the second pool of storage. In some embodiments of the IHS, the computing module may be further configured to monitor, at a storage device of the first plurality of storage devices, each given storage device of the first plurality of storage devices for one or more warning indications (including but not limited to hard errors, soft errors, and/or warnings, and/or failures detected from one or more event logs). In some embodiments of the IHS, the computing module may be further configured to automatically take corrective action, based on results of the monitoring, prior to a loss of synchronization event and prior to a failure of the first volume.

In some embodiments of the IHS, the computing module may be further configured to automatically take corrective action including replacing the second volume with the first volume, prior to the loss of synchronization event and prior to the failure of the first volume. In some embodiments of the IHS, the computing module may be further configured, based on results of the monitoring, to detect one or more conditions and initiate the automatically taken corrective action based upon a predefined threshold associated with the one or more conditions.

In some embodiments of the IHS, the one or more warning indications may be at least one of: invisible to a user and inaccessible to a user. In some embodiments of the IHS, the one or more warning indications may include at least one of: a lost block, a disk error, a port down, a network link error, and a hardware fault. In some embodiments, the one or more warning indications may include at least one of: a lost block, a disk error (including but not limited to logical block addressing, or LBA errors), a port down, a network link error, a network link error for an extended period of time, and/or a hardware fault including but not limited to a controller failover and/or power supply unit (PSU) failure, a hard error, a soft error, a warning, and/or a failure indication. Some embodiments may detect one or more warning indications from one or more event logs. In some embodiments of the IHS, the computing module may be further configured to monitor, at the storage device of the first plurality of storage devices, for one or more warning indications in one or more event logs that are associated with each given storage device.

In some embodiments of the IHS, the computing module may be further configured to automatically take corrective action including running a rescan on the second volume, mounting storage devices of the second volume, registering one or more virtual machines (VMs) of the second volume, and/or powering on one or more virtual machines (VMs) of the second volume. In some embodiments of the IHS, the computing module may be further configured to replace the second volume with the first volume including configuring the second volume using at least one of: a different number of storage devices and a different arrangement of storage devices, as compared with the second volume, without loss of data from the first volume.

In some embodiments of the IHS, the computing module may be further configured to synchronize, including performing one or more bi-directional acknowledgements between the first pool of storage and the second pool of storage.

Some embodiments are directed to a non-transitory computer readable medium having stored thereon a sequence of instructions which, when loaded and executed by a processor coupled to an apparatus, may cause the apparatus to: provide a first pool of storage having a first plurality of storage devices and an associated first volume; provide a second pool of storage having a second plurality of storage devices and an associated second volume, data of the first pool of storage corresponding to data of the second pool of storage, the first pool of storage and the second pool of storage not sharing the same controller; synchronize, by a storage device of the first plurality of storage devices, the first pool of storage with the second pool of storage; monitor, at a storage device of the first plurality of storage devices, each given storage device of the first plurality of storage devices for one or more warning indications (including, but not limited to, hard errors, soft errors, and/or warnings and/or failures detected from one or more event logs); and automatically take corrective action, based on results of the monitoring, prior to a loss of synchronization event and prior to a failure of the first volume.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
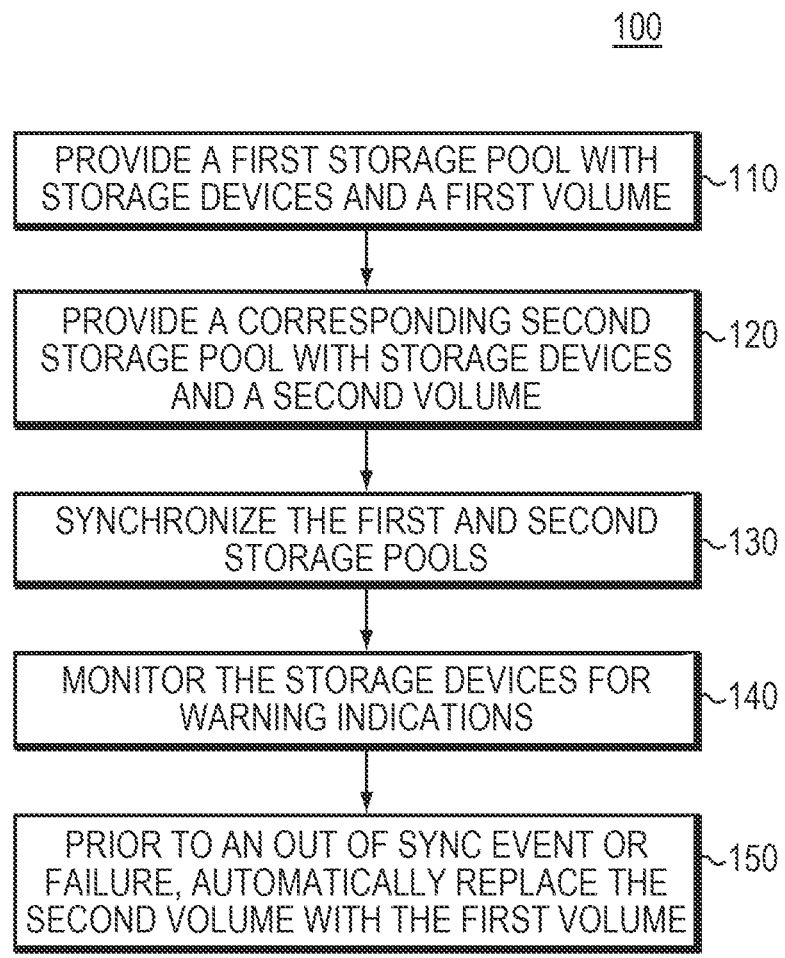
FIG. 1 is a flowchart directed to detecting (and/or monitoring for) and handling one or more warning (and/or error) indications within (and/or across) one or more synchronized replication pools, according to some embodiments.

A description of example embodiments follows.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Synchronous replication, as illustrated in FIGS. 5A-5D to more detail follow, is an existing approach to handling data storage. Some embodiments may enhance this existing synchronous replication by monitoring for various failure indications at the storage device level that may be invisible/inaccessible to a user within an active virtual machine (VM) pool. Some embodiments may monitor for failure indications (which may include but are not limited to, logical block address or LBA error indications) in one or more event logs of storage devices. In some embodiments, the one or more event logs of a given storage device may include event logs that the storage device receives from one or more switches, from one or more hosts, from one or more other storage devices, and/or from the given storage device itself.

Some embodiments, based on the results of the monitoring, may automatically take a corrective action, by switching to the standby virtual machine (VM) pool (moving a volume from one pool to another pool) in order to avoid a failure of a volume. Some embodiments may automatically switch over to the standby VM pool, run a rescan, mount data stores, register VMs, and power on VMs. In existing approaches, a user's first indication of failure may be a failure of an entire volume, which may be a failure that may be avoided by the monitoring of individual storage devices of some embodiments.

Some embodiments include additional advantages in comparison with existing approaches. Existing approaches may mirror entire storage devices with other entire storage devices. Some embodiments may perform mirroring based upon volumes, rather than merely based upon storage devices as in existing approaches. As such, some embodiments are not limited to a one-to-one mirroring of storage devices. Some embodiments are capable of mapping an active volume configuration to a different number and/or configuration of storage devices than in a standby volume configuration. Yet another advantage of some embodiments, by comparison with existing recovery applications, is that the some embodiments may detect and handle storage failures locally rather than at a recovery site.

By contrast with some embodiments, existing approaches fail to provide a solution for monitoring and detecting user-invisible warnings (including, but not limited to, hard errors, soft errors, and/or warnings, including but not limited to failures detected from one or more event logs) in order to prevent synchronous replication volumes from getting out of sync. Some existing tools may monitor a storage array to determine an amount of disk space remaining, in order to prevent the array from running out of space. However, existing tools may not prevent a synchronous replication volume from getting out of sync.

Other existing tools, such as a Site Recovery Manager (SRM) also may fail to provide a solution for monitoring and detecting failures in a synchronization pool. First, SRM synchronizes (e.g., syncs) across groups rather than within pools of a given group. By contrast to SRM, some embodiments may synchronize within pools of a given group. Second, in SRM, monitoring is not performed at the individual array level. By contrast to SRM, some embodiments may perform monitoring at the individual array level. Third, in SRM, an entire site is shut down. By contrast to SRM, some embodiments may keep both sites (e.g. pools) up and running, which may enable a user to take corrective measures for the site where one or more failures may be identified. Fourth, SRM has a manual switchover. By contrast to SRM, some embodiments perform an automatic switchover between pools.

Yet other existing tools, such as a Data Protection Manager, may handle backup that may take a long time to recover and may not be suitable for disaster recovery applications. By contrast with Data Protection Manager, some embodiments may enable prompt disaster recovery because in some embodiments the pools may be synchronized. In some embodiments, an acknowledgement may be performed bi-directionally, e.g. between the primary pool (and/or volume) and the secondary pool (and/or volume), by contrast with Data Protection Manager in which backup is a one way information passing stream with no acknowledgement.

Background—Synchronous Replication (SyncRep)

Some embodiments may use the existing approach of Synchronous Replication (SyncRep). In some embodiments, SyncRep may include simultaneous writing of storage volume data across two or more different storage pools in the same group, resulting in two or more hardware-independent copies of storage volume data. SyncRep may acknowledge write completion when the source and target volume complete writes. Even if one pool is unavailable, due to a power failure and/or other resource outage, volume data may be obtained from the alternate pool.

Some embodiments may include one or more of the following SyncRep features and advantages. SyncRep may include the process of copying data over a storage area network, in order to achieve two or more copies of the data. SyncRep may write data to the active and/or alternate sites synchronously prior to sending an acknowledgement back to the host (initiator), so that the data may remain current in both the active and alternate sites (and/or locations). An advantage of SyncRep is that may be desirable for applications with short recovery time objectives (RTOs) and/or a real-time recovery point objective (RPOs). SyncRep may enable quick recovery, including, but not limited to, scenarios where a copy of the data (associated with a given volume) may be unavailable. SyncRep may be implemented using firmware which may be located on the a storage device and/or host machine. SyncRep may be operating system agnostic. SyncRep may include a real-time protection solution.

SyncRep may include two or more storage pools. An Active Synchronous (SyncActive) pool may include one or more pools that may connect to one or more hosts (e.g., iSCSI initiators) that may read and/or write volume data on the one or more pools. When volume data is written to the SyncActive pool, the group may simultaneously write the same data to the Alternate Synchronous (SyncAlternate) pool.

In some scenarios, a changing the pool (and/or selecting a different or alternate pool) which a host uses may be desirable. As such, according to some embodiments, one or more of the following two approaches may be used in order to make a pool relationship change, including but not limited to a switch from use of a SyncActive pool to a SyncAlternate pool.

First, a switch to a SyncAlternate pool may be performed manually, and the switch may be performed when the SyncAlternate volume is in sync. During the switch, host connections may be logged out. The hosts (e.g., iSCSI initiators) may automatically reconnect when the switch completes. In some embodiments, iSCSI target configuration changes are not required. In some embodiments, volume data is not lost as part of the switch. According to some embodiments, SyncRep may also perform one or more the following steps as part of the switch: switch from a SyncActive volume to a SyncAlternate volume; notify the host of the switch and rescan and remount the volume to the new SyncAlternate volume; invoke an application and/or one or more virtual machines (VMs); and echo (and/or record) an event for tracking purposes.

Second, a failover to the SyncAlternate is a pool relationship change that may be triggered as a result of a fault occurring in the SyncActive pool. Failover to the SyncAlternate pool may be used in order to bring the SyncAlternate copy of data online. In some embodiments, the SyncAlternate failover may be executed when the SyncRep status indicates an out of sync event (and/or state). According to some embodiments, SyncAlternate failover may be triggered as a result of three or more failover situations, including but not limited to the following situations. First, a failover may be triggered as a result of an out of sync event (and/or state) when both SyncActive and SyncAlternate pools are online (e.g., one member down in a multi-member pool). Second, a failover may be triggered as a result of an out of sync event (and/or state) because of an infrastructure problem and/or a scenario where both SyncActive and SyncAlternate pools are online but are not communicating (e.g. a network switch down). Third, a failover may be triggered as a result of an out of sync event because the SyncActive pool is offline.

In addition, in some embodiments, if a volume associated with a SyncActive pool is out of sync, then the option to switch the pools may be replaced with an option to failover to the SyncAlternate pool. A failover to the SyncAlternate option may be available when a fault occurs. Some embodiments may failover to the SyncAlternate pool when the volume is out of sync and/or the volume is offline.

Also, in some embodiments, a new SyncActive volume (formerly SyncAlternate) may accept writes and/or track changes made while the original SyncActive volume is offline. In some embodiments, for a new SyncActive volume, depending on the host configuration and application requirements, the host initiator may log onto the new SyncActive volume and/or restart its associated applications.

Some embodiments may include, but are not limited to, the existing approaches to synchronous replication that are illustrated in FIGS. 5A-5D. The following publication, of which substantive portions are included below in order to illustrate Synchronous Replication, is hereby incorporated by reference in its entirety herein: *Technical Report, Dell EqualLogic PS Series Array: Understanding Synchronous Replication* (*SyncRep*), TR1085, V1.0, August 2012.

Figure 5A:
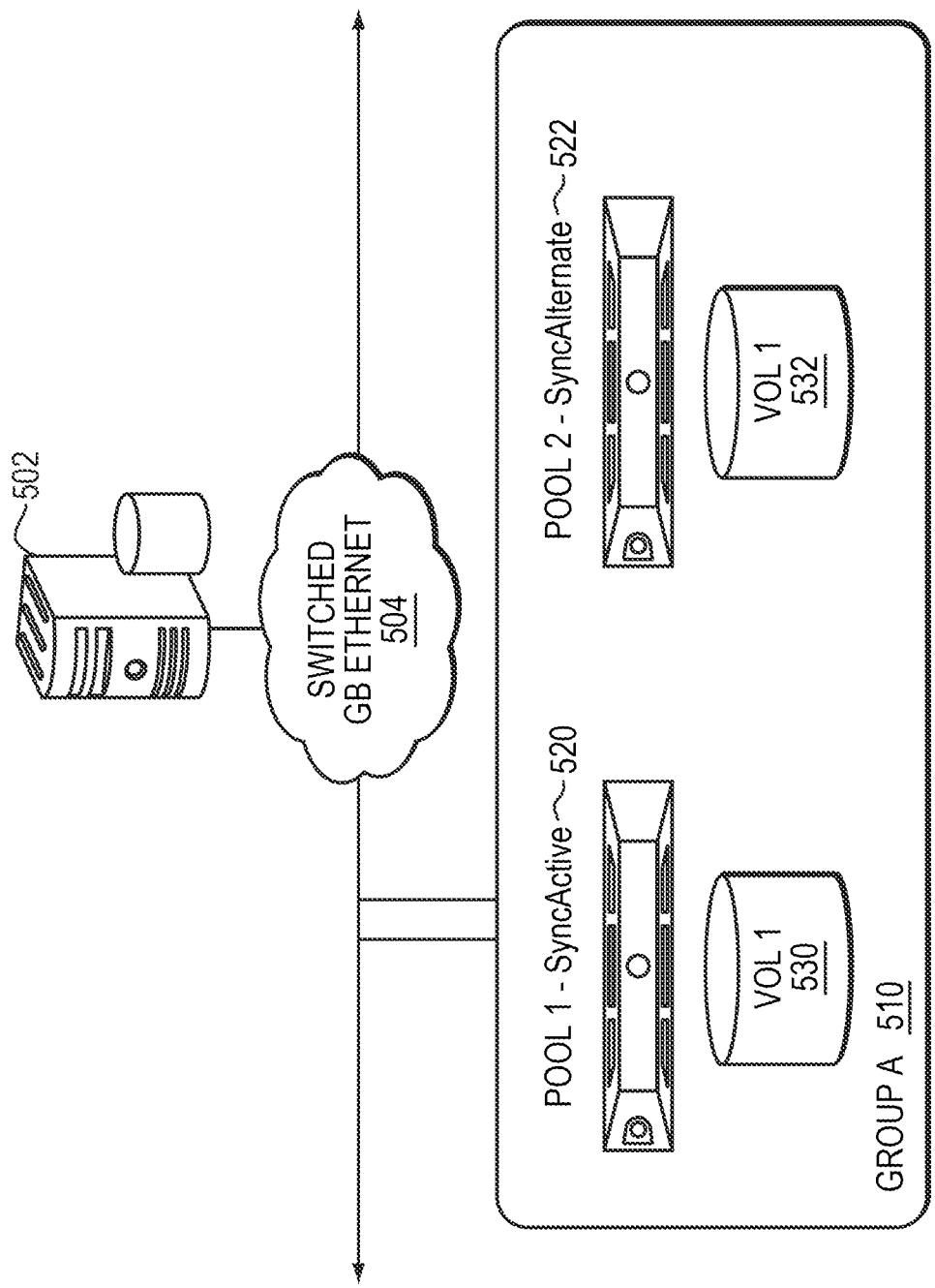
FIGS. 5A-5D are block diagrams that illustrate synchronous replication environments, in which some embodiments may be implemented.

As illustrated in FIG. 5A, a storage network may include one or more hosts 502 that may communicate over a network 504 to one or more groups 510. Each group may include one or more pools 520, 522 and each pool may have one or more respective volumes (530, 532, respectively). Synchronous Replication (SyncRep) may be enabled on a per-volume basis. In volumes for which synchronous replication is not enabled, volume data and snapshots may be located only in the pool to which the volume is assigned. In synchronous replication-enabled volumes, volume data may exist simultaneously in two pools.

As illustrated in FIG. 5A, an active synchronous (SyncActive) pool (520) may include a pool to which one or more iSCSI initiators (e.g., hosts 502) may be connected to when reading and writing volume data 530. When volume data 530 is written to the SyncActive pool 520, the group 510 may simultaneously write the same data to an alternative synchronous (SyncAlternate) pool (522). According to some embodiments, the SyncActive pool 520 and SyncAlternate pool 522 may switch roles.

Also as illustrated in FIG. 5A, a host 502 may switch (e.g., switchover) between using either the SyncActive pool 520, or alternatively, the SyncAlternate pool 522. When switched over (and/or replaced), the former SyncActive pool 520 then may become the SyncAlternate pool 522, and vice-versa. In some embodiments, no iSCSI target configuration changes may be required. During a switchover, host 502 connections may be logged out. Depending on the configuration, an iSCSI initiator (which may be located at the host 502, pool 520, pool 522, and/or another location) may reconnect automatically and transparently when the switchover completes.

SyncRep—Initial Synchronization

Figure 5B:
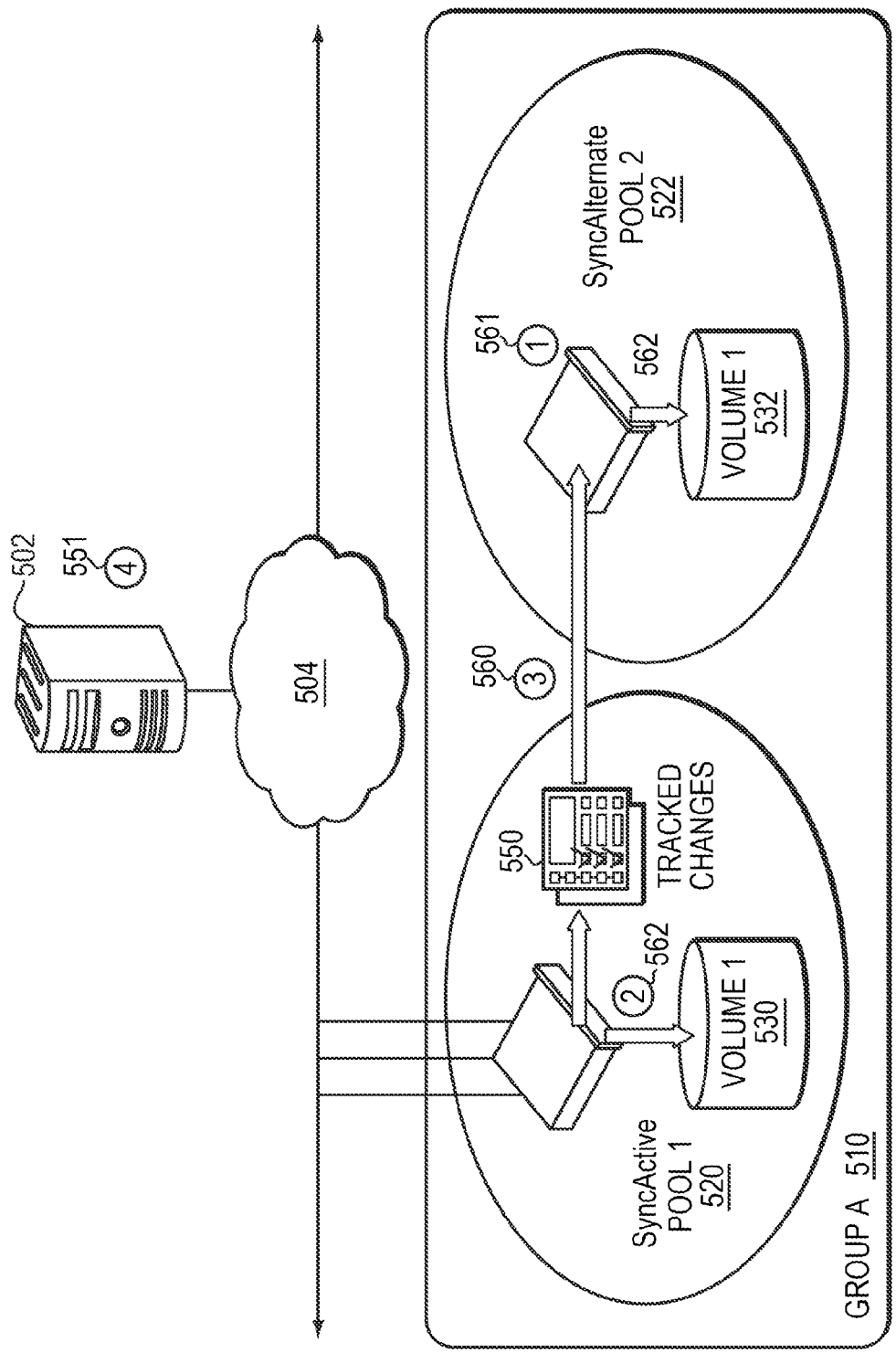

As illustrated in the group 510 of pools 520, 520 of FIG. 5B, the first time one or more volumes 530 are configured with SyncRep, one or more mirror volumes 532 may be created in the SyncAlternate pool 522 and the SyncActive volume 530 may replicate 560 data to the SyncAlternate volume 532. This replication process 560 may occur in the background and non-replicated changes may be tracked and sent 550 to the SyncAlternate volumes 532. As a result, new input/output accesses (I/O) may continue to one or more of the pools 520, 522. In summary, steps for "Initial Synchronization" may include one or more of the following steps, as illustrated in FIG. 5B:

1. Create 561 one or more SyncAlternate volumes 532.
2. The SyncActive volume 530 and SyncAlternate volume 532 may receive 562 one or more updates.
3. Changes 550 that are sent 560 to the SyncAlternate volume 532 may be tracked 550.
4. The host 502 may receive acknowledgement 551 of changes 550 from the SyncActive volume 530 over the network 504.

For SyncRep, the "Initial Synchronization" of FIG. 5B may also include (and/or consider) one or more of the following factors: (1) initial volume size (SyncActive), given that large volumes, when full of data, may take additional time to synchronize; (2) network bandwidth between pools, given that bandwidth constraints may affect the time to complete initial synchronization of large volumes—according to some embodiments, a 500 gigabyte (GB) volume may take at least an hour over a dedicated one Gigabit Ethernet (1 GigE) network to initially synchronize; (3) other activity occurring on these pools during initial synchronization, given that writes at the SyncAlternate Pool may favor user application traffic and/or may delay the overall time to synchronize.

SyncRep—Synchronous Replication States

A volume that may be configured for SyncRep may be in one or more of the following three states, but is not so limited: (1) the sync state, (2) the paused state, or (3) the out of sync state.

Figure 5C:
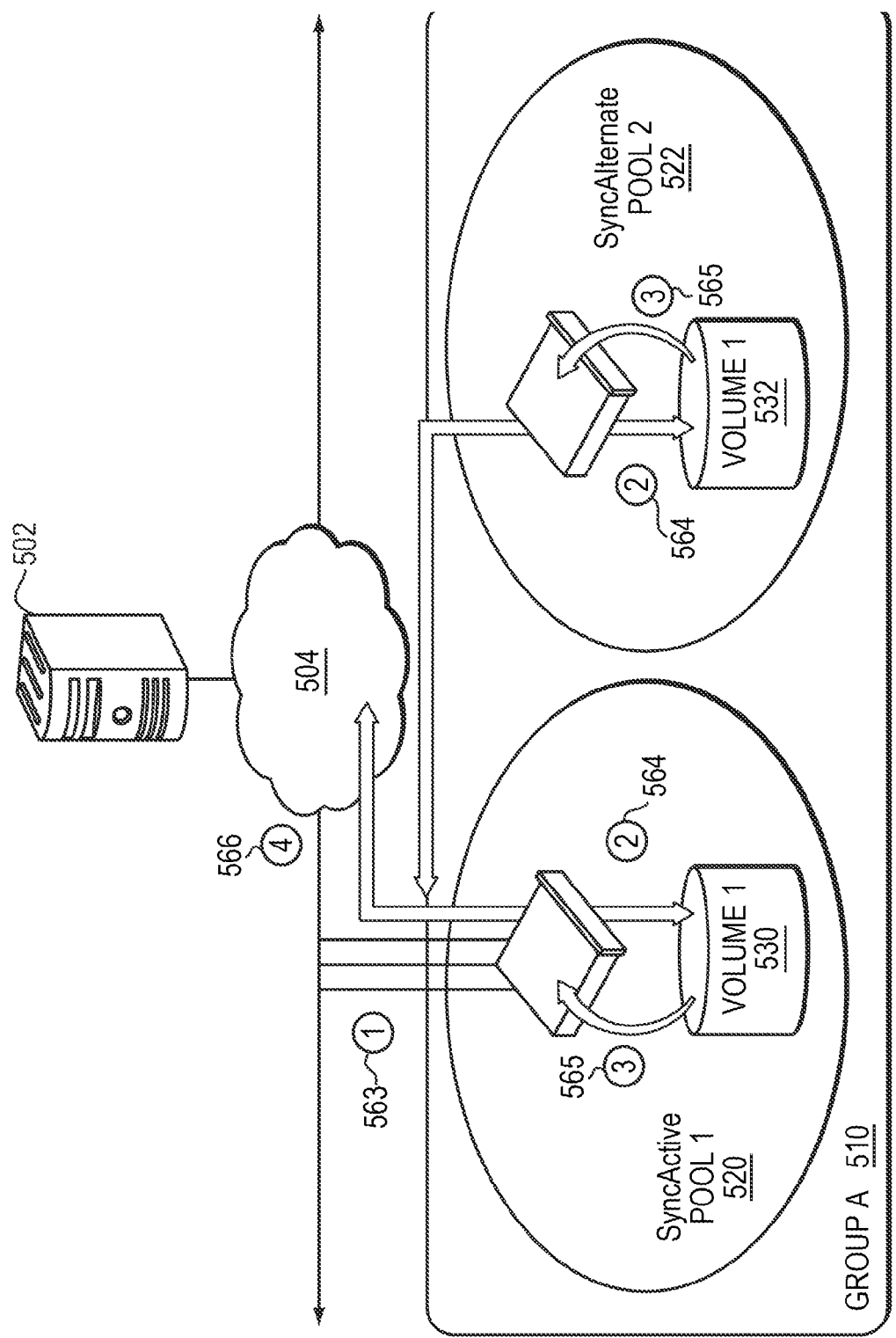

As illustrated in FIG. 5C, when a volume is in the in sync state, both the SyncActive pool 520 and the SyncAlternate pool 521 may include the same volume data. Switching roles between pools is allowed. In sync state process steps are illustrated in FIG. 5C and described as follows:

1. The host (e.g., iSCSI initiator) 502 may send a write 563 to the group 510.
2. In some embodiments, writes may be performed 564 on both volumes 530, 532. Preferably, reads initiated by the host 502 may be performed from the SyncActive volume 530.
3. SyncActive and SyncAlternate volumes 530, 532 may acknowledge 565 to the group 510 that the writes 563 are complete.
4. The writes 563 may then be confirmed 566 to the host (e.g., iSCSI initiator) 502 through the network 504.

Note that a pool switchover (e.g., switch) for a synchronous replication volume may swap the roles of the SyncActive and SyncAlternate pools. As part of the switchover operation, the SyncActive pool may change to be the SyncAlternate pool and the SyncAlternate pool may change to be the SyncActive pool. A switchover may be triggered based upon planned maintenance on SyncActive when the volumes are in sync.

SyncRep may achieve the paused state through a graphical user interface (GUI) user command and/or other means. While SyncRep is paused, the volume may be online, and initiators may connect to and/or write to the SyncActive volume. SyncRep may be paused and may later be resumed (e.g., during a maintenance time window during which the SyncAlternate pool is taken offline). If data is written to the volume while synchronous replication is paused, it may preferably be written to the SyncActive pool, and the two pools may be out of sync. The group may track volume writes while synchronous replication is paused and when synchronous replication is resumed, the tracked changes may be written to the SyncAlternate pool.

Figure 5D:
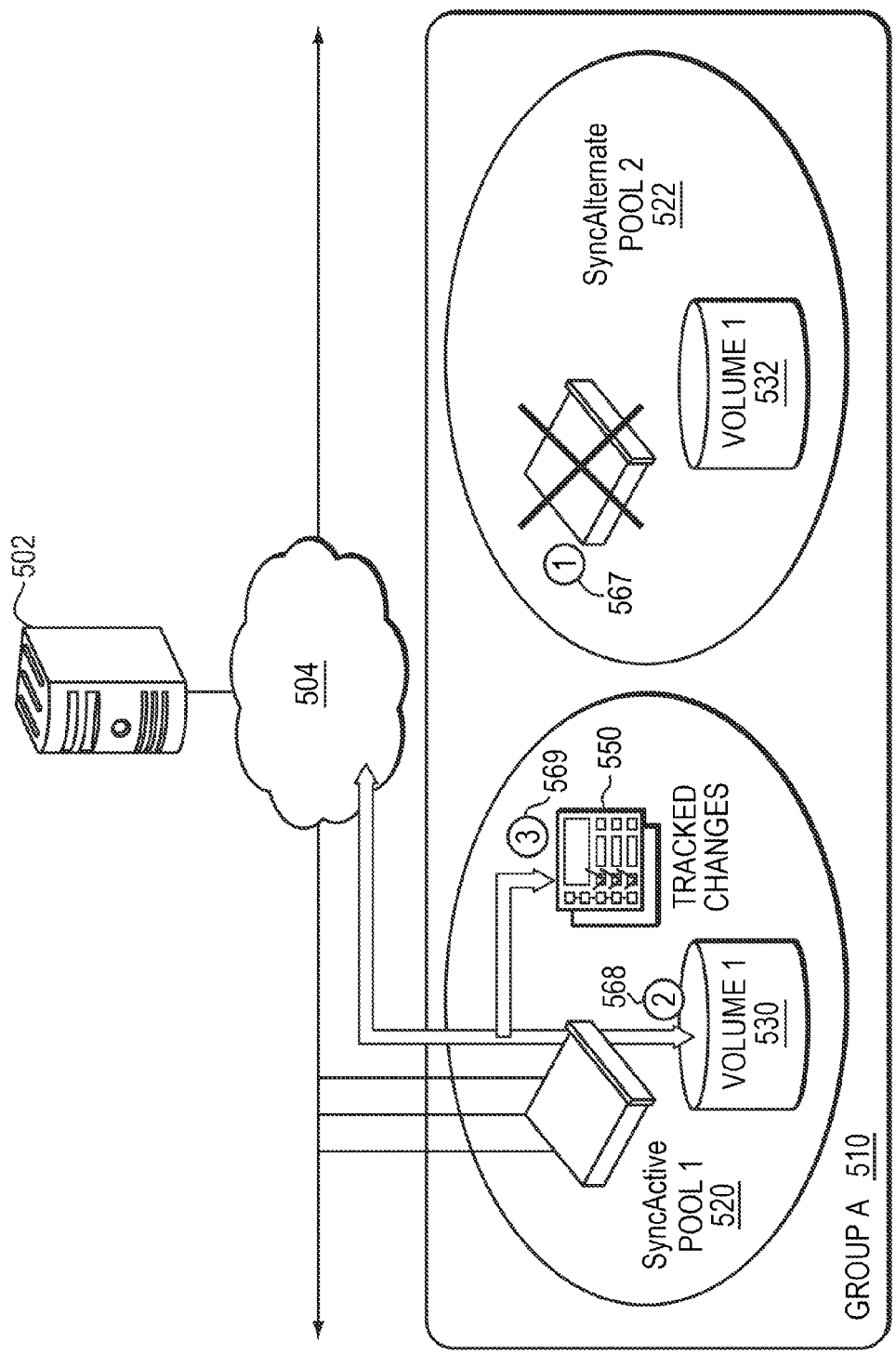

As illustrated in the group 510 of FIG. 5D, in the out of sync state, the SyncActive pool 520 and SyncAlternate pool 522 may not include the same volume data, e.g., the SyncActive pool 520 may include the most recent volume data. A SyncActive volume 530 may go out of sync if synchronous replication is paused, if the SyncAlternate pool is unavailable or has no free space, or if there is insufficient bandwidth between the SyncActive and SyncAlternate pools 520, 522 to keep up with the write demand on the volume.

The out of sync state may include one or more of the following process steps:

1. SyncAlternate pool 522 and its respective volume 532 may be unavailable 567.
2. One or more reads and/or writes may occur 568 in a SyncActive pool 520 to its respective volume 530.
3. Changes may be tracked 550 and failover (as described in more detail above, e.g., with respect to SyncAlternate failover) may be enabled 569.

According to some embodiments, the host 502 may be notified of tracked changes 550 through the network 504. According to some embodiments, if the SyncActive volume is out of sync, the option to switch the pools may be replaced with the option to failover to the SyncAlternate pool. A failover to the SyncAlternate option may be available when a fault occurs. A failover to the SyncAlternate pool may occur when the volume is out of sync and/or the volume is offline. When Synchronous Replication is paused by an administrator user, the volumes may go out of sync.

Automatic Synchronization Monitoring

As a novel functional improvement over existing SyncRep approaches, some embodiments may include a novel feature of automatic synchronization monitoring (namely, AutoSync monitor), which may be used to monitor the SyncActive volume in a given pool. According to some embodiments, if a failure (including, but not limited to, a warning and/or an error) occurs on the SyncActive volume, an automatic switch to the SyncAlternate volume may be performed.

In existing storage configurations (and/or environments) that use synchronous replication (SyncRep) volumes, if one pool fails, volume data may be obtained from the corresponding secondary pool. At least one deficiency with such existing configurations is that the volume data may not be automatically obtained. Existing approaches may manually switch from the SyncActive pool to the SyncAlternate pool, manually run a rescan of the datastore, register virtual machines (VMs), and then power on each VM.

Existing approaches do not include a tool that automatically switches failed SyncActive volumes from a failed pool to their SyncAlternate volumes. By contrast, some embodiments may automate the process of switching from SyncActive to SyncAlternate Volumes. Some embodiments may interface with VMWARE as a standalone program and/or from within a given VSM product. In contrast to existing approaches, some embodiments may detect one or more issues with the SyncActive pool and may automatically switchover from the SyncActive pool to the SyncAlternate pool, automatically run a rescan, automatically mount the datastores, automatically register one or more VMs, and/or automatically power on one or more VMs.

Some embodiments may monitor one or more events, so that if an out of sync event occurs, some embodiments may automate the switchover process and have the volume switch between pools prior to going out of sync and or offline. As such, some embodiments provide comprehensive data protection. Some embodiments may proactively monitor the SyncRep volume and keep that volume online and active even if the volume goes out of sync. By contrast, existing approaches fail to proactively keeping Syncrep volumes online. At best, existing approaches provide tools for monitoring of thin provisioned volumes, to keep the volumes online, and ensure that volumes do not run out of disk space.

Some embodiments may be applied to synchronous replication applications that include one or more operating systems, including, but not limited to WINDOWS, UNIX, LINUX, VMWARE, HYPER-V, REDHAT, DEBIAN, UBUNTU, and/or other types of operating systems. In addition, some embodiments may be applied to SRM locally (e.g., within one group to move a volume from one pool to the next).

FIG. 1 illustrates an embodiment 100 of the method (and system) for detecting and handling synchronous replication warnings and/or errors. Some embodiments may provide a first pool of storage having a first plurality of storage devices and/or an associated first volume 110. Next, some embodiments may provide a corresponding second pool of storage that may have a second plurality of storage devices and/or an associated second volume 120. In some embodiments, data of the first pool of storage may correspond to data of the second pool of storage. In some embodiments, the first pool of storage and the second pool of storage preferably may not share the same controller. Then, some embodiments may synchronize, by a storage device of the first plurality of storage devices, the first pool of storage with the second pool of storage 130. Next, some embodiments may monitor, at a storage device of the first plurality of storage devices, each given storage device of the first plurality of storage devices for one or more warning indications 140. Further, some embodiments may automatically take corrective action, prior to a loss of synchronization event and/or prior to a failure of the first volume 150.

In some embodiments, automatically taking corrective action may include replacing the second volume with the first volume, prior to the loss of synchronization event and/or prior to the failure of the first volume. Some embodiments, based on results of the monitoring, may automatically take corrective action, prior to a loss of synchronization event and/or prior to a failure of the first volume. In some embodiments, automatically taking corrective action may include replacing the second volume with the first volume, prior to the loss of synchronization event and/or prior to the failure of the first volume.

Some embodiments, based on results of the monitoring, may detect one or more conditions and/or initiate the automatically taken corrective action based upon a predefined threshold associated with the one or more conditions. Some embodiments, based on results of the monitoring, may detect one or more conditions and initiate the automatically taken corrective action based upon a predefined threshold associated with the one or more conditions. In some embodiments, the one or more warning indications may be at least one of: invisible to a user and inaccessible to a user.

In some embodiments, the one or more warning indications may include at least one of: a lost block, a disk error (including but not limited to logical block addressing, or LBA errors), a port down, a network link error, a network link error for an extended period of time, and/or a hardware fault including but not limited to a controller failover and/or power supply unit (PSU) failures. In some embodiments, the storage device of the first plurality of storage devices may monitor for one or more warning indications in one or more event logs that may be associated with each given storage device.

Some embodiments may automatically take corrective action, further including running a rescan on the second volume, mounting storage devices of the second volume, registering one or more virtual machines (VMs) of the second volume, and/or powering on one or more virtual machines (VMs) of the second volume.

Some embodiments may replace the second volume with the first volume, including configuring the second volume using at least one of: a different number of storage devices and a different arrangement of storage devices, as compared with the second volume, without loss of data from the first volume. In some embodiments, synchronizing may include performing one or more bi-directional acknowledgements between the first pool of storage and the second pool of storage.

Referring to FIG. 1, some embodiments may monitor 140 for one or more warning (and/or error) indications (and/or conditions) including, but not limited to, a soft error, and/or a hard error. Soft errors may include one or more errors that preferably do not take the SyncActive volume offline. Soft errors may include network errors and controller failovers. By contrast with soft errors, hard errors may be more likely to take the SyncActive offline. Some examples of hard errors may include lost blocks and/or disk errors.

Figure 2A:
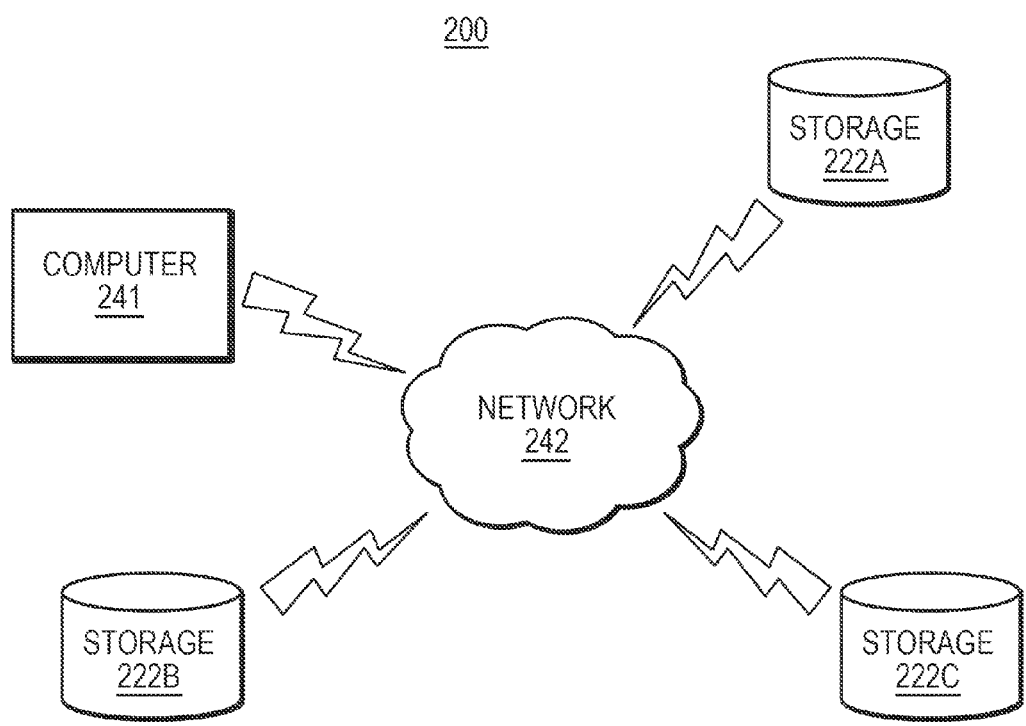
FIG. 2A is a schematic view of a computer network environment in which some embodiments may be implemented.

FIG. 2A illustrates a computer network environment 200 in which some embodiments may be implemented. The computer 241 and the sets 222A, 222B, 222C of one or more storage devices (each one of the sets 222A, 222B, 222C representing one or more storage devices) are linked through network 242. The computer 241 and the sets 222A, 222B, 222C of one or more storage devices may be connected through any network as is known in the art, including a storage area network (SAN), a wide area network (WAN) or local area network (LAN). The computer 241 may embody an information handling system (IHS) 320 (referring to FIG. 3 to follow) and/or any embodiment of the IHS described herein. Similarly, the computer 241 may be configured to carry out any method or embodiment thereof described herein.

According to some embodiments, a host computer 241 (and/or NAS server) may be configured to automatically detect and handle one or more failures (including, but not limited to, hard errors, soft errors, and/or warnings, including but not limited to failures detected from one or more event logs) on one or more storage devices in a given storage pool (including, but not limited to, one or more sets 222A, 222B, 222C of storage devices). While three sets 222A, 222B, 222C of storage devices are depicted, the computer network environment 200 may comprise any number of storage devices.

Figure 2B:
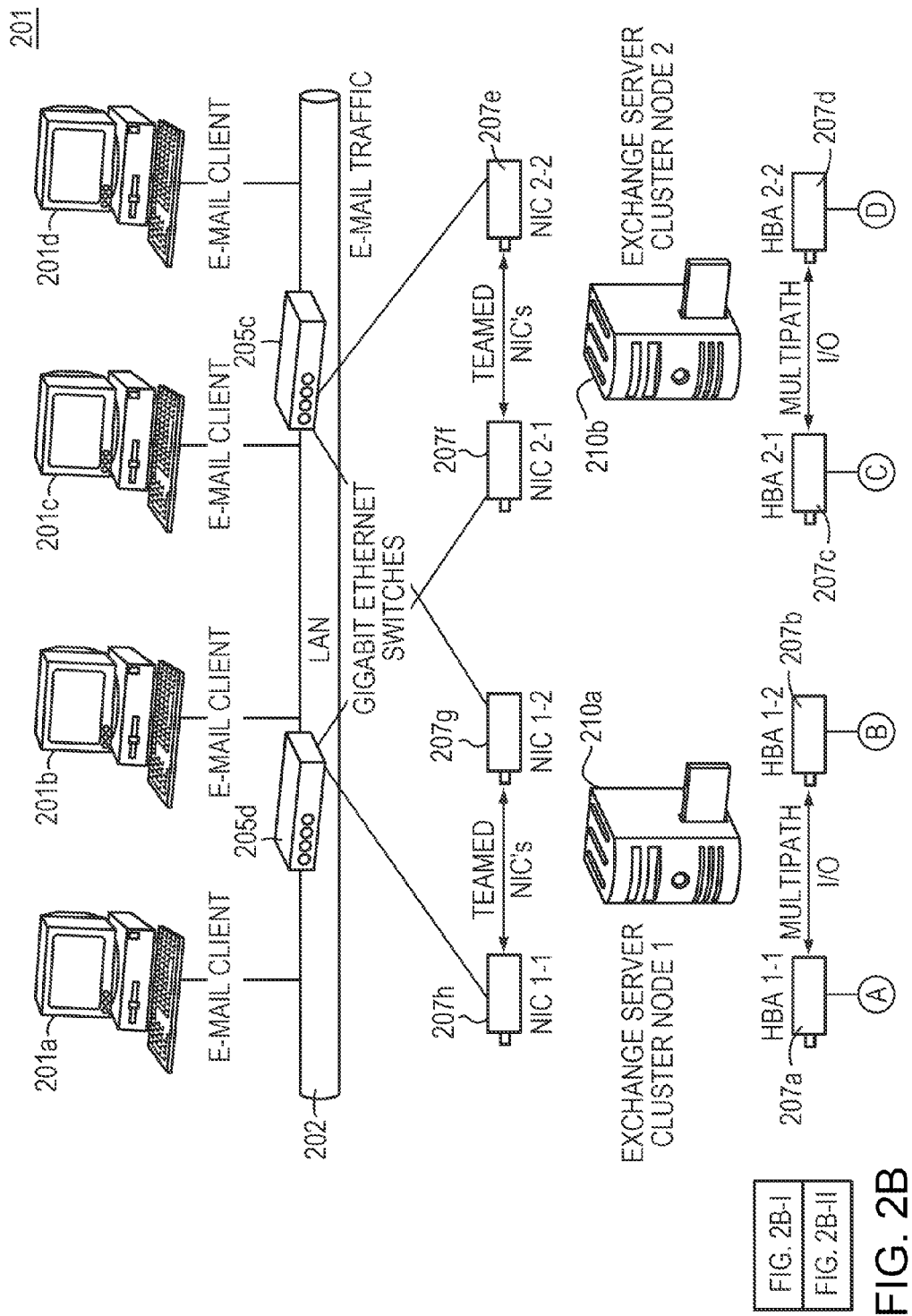
FIG. 2B (FIGS. 2B-I and 2B-II) is a block diagram view of another computer network environment in which some embodiments may be implemented.

As illustrated in FIG. 2B (FIGS. 2B-I and 2B-II), some embodiments may run on a network 201 that may include, but is not limited to, a storage area network (SAN) 203 and a local area network (LAN) 202. The LAN 202 may include components such as one or more clients 201a, 201b, 201c, 201d that communicate through one or more network switches 205c, 205d to one or more network interface cards (NICs) 207e, 207f, 207g, 207h to one or more servers 210a, 210b. The SAN 203 may include, but is not limited to, an Internet Protocol (IP) SAN. The SAN 203 may include components such as one or more servers 210a, 210b that communicate to one or more network switches 205a, 205b through a set of one or more network interface cards (NICs) 207a, 207b, 207c, 207d. Network switches 205a, 205b of the storage area network 203 may communicate to Peer Storage (PS) series arrays 220a, 220b across the SAN 203. Therefore, the SAN 203 may include components such as a PS series group 222 that may include, but is not limited, to, storage groups 221a, 221b and PS series data arrays 220a, 220b. The PS series group 222 may include a given set (referring to each of 222A, 222B, and 222C of FIG. 2A) of storage devices. In some embodiments, the SAN 203 may be considered to include the LAN 202 and the above-mentioned components with which the LAN 202 communicates, in addition to the above-mentioned components with which the SAN 203 communicates.

Figure 3:
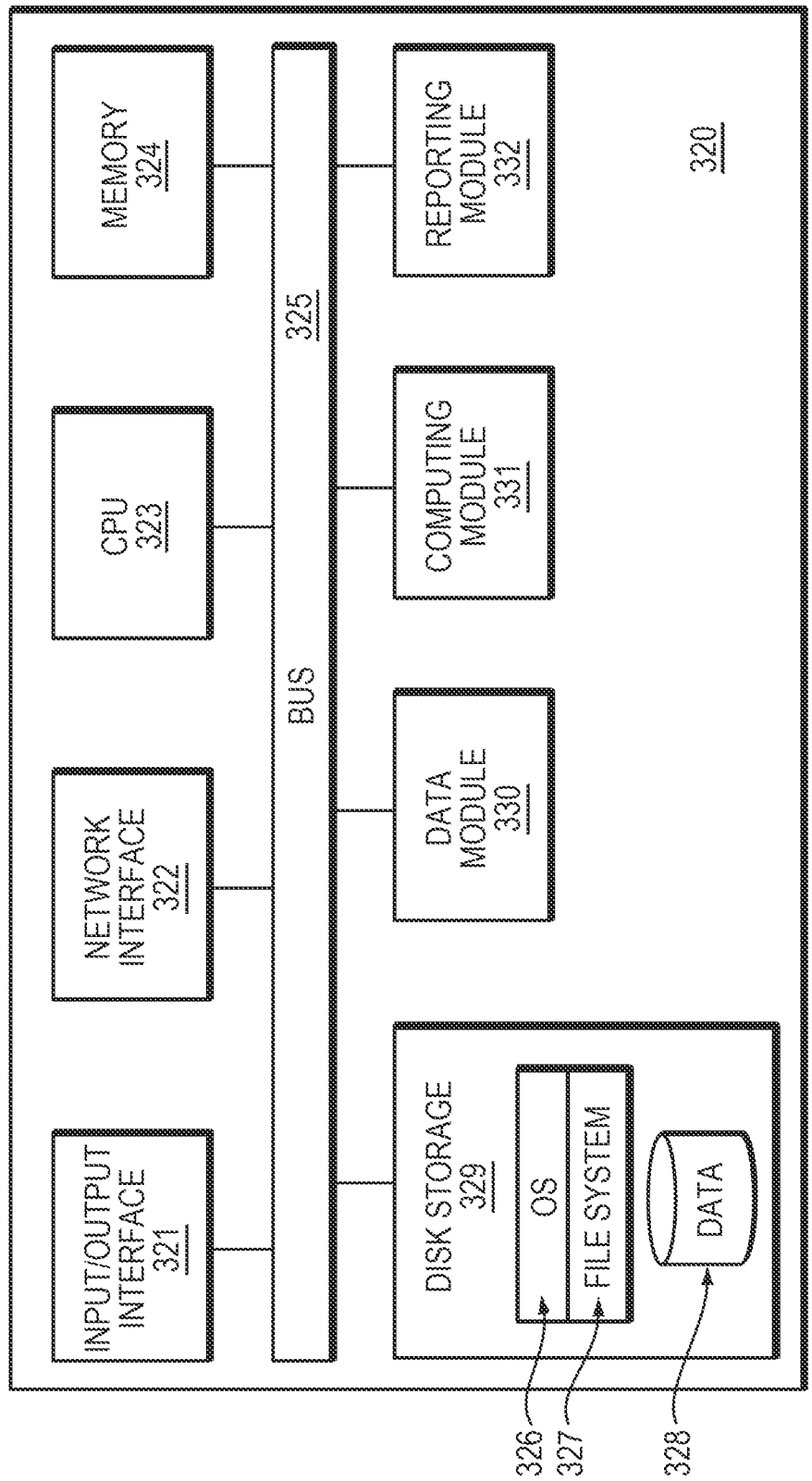
FIG. 3 is a simplified block diagram of an information handling system (IHS) according to some embodiments.

FIG. 3 is a high level block diagram of an information handling system (IHS) 320 that may be configured to automatically detect and handle one or more failures (including, but not limited to, hard errors, soft errors, and/or warnings, including but not limited to failures detected from one or more event logs) on one or more storage devices in a given storage pool according to some embodiments. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. A Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Communicatively coupled with the OS 326 is the file system 327. Disk storage 329 may be any storage device known in the art.

Some embodiments of the IHS 320 may comprise a data module 330 which may be configured to provide a first pool of storage having a first plurality of storage devices and an associated first volume. In some embodiments, the data module 330 may be further configured to provide a second pool of storage having a second plurality of storage devices and an associated second volume. In some embodiments, data of the first pool of storage may correspond to data of the second pool of storage. In some embodiments, the first pool of storage and the second pool of storage preferably may not share the same controller (e.g, the same redundant array of independent disks controller, or RAID controller).

Some embodiments of the IHS 320 may comprise a computing module 331 that may include a first set of one or more storage devices 329. According to some embodiments of the IHS 320, the computing module 331 may be configured to synchronize, by a storage device of the first plurality of storage devices, the first pool of storage with the second pool of storage through the input/output interface 321 or the network 322 via a bus 325.

In some embodiments of the IHS 320, the computing module 331 may be further configured to monitor, at a storage device of the first plurality of storage devices, each given storage device of the first plurality of storage devices for one or more warning indications (including, but not limited to, hard errors, soft errors, and/or warnings, including but not limited to failures detected from one or more event logs). In some embodiments of the IHS 320, the computing module 331 may be further configured to automatically take corrective action, based on results of the monitoring, prior to a loss of synchronization event and/or prior to a failure of the first volume.

In some embodiments of the IHS 320, the computing module 331 may be further configured to automatically take corrective action including replacing the second volume with the first volume, prior to the loss of synchronization event and prior to the failure of the first volume. In some embodiments of the IHS 320, the computing module 331 may be further configured, based on results of the monitoring, to detect one or more conditions and initiate the automatically taken corrective action based upon a predefined threshold associated with the one or more conditions.

In some embodiments of the IHS 320, the one or more warning indications may be at least one of: invisible to a user and inaccessible to a user. In some embodiments of the IHS 320, the one or more warning indications may include at least one of: a lost block, a disk error, a port down, a network link error, and a hardware fault. In some embodiments of the IHS 320, the computing module 331 may be further configured to monitor, at the storage device of the first plurality of storage devices, for one or more warning indications in one or more event logs that are associated with each given storage device.

In some embodiments of the IHS 320, the computing module 331 may be further configured to automatically take corrective action including running a rescan on the second volume, mount storage devices of the second volume, register one or more virtual machines (VMs) of the second volume, and/or power on one or more virtual machines (VMs) of the second volume. In some embodiments of the IHS 320, the computing module 331 may be further configured to replace the second volume with the first volume including configuring the second volume using at least one of: a different number of storage devices and a different arrangement of storage devices, as compared with the second volume, without loss of data from the first volume.

In some embodiments of the IHS 320, the computing module 331 may be further configured to synchronize, including performing one or more bi-directional acknowledgements between the first pool of storage and the second pool of storage.

Some embodiments of the IHS 320 may include a reporting module 332 configured to present results of the error monitoring, detection, handling and/or automatic switchover to a user. The data module 330 and/or computing module 331 and/or reporting module 332 may be communicatively coupled to each other as illustrated in FIG. 3.

In some embodiments, the data module 330 may be further configured to retrieve and/or update data stored in disk storage 329 to perform the above-mentioned functions. For example, the data module 330 may copy data to and/or from the storage device 329 or via the input/output interface 321 or network interface 322. The data module 330 may copy data to and/or from any communicatively coupled source, including, but not limited to, the computing module 331, the reporting module 332, the network 322, the input/output interface 321, the memory 324, or disk storage 329.

While the various components of the IHS 320 are illustrated in FIG. 3, embodiments of the IHS 320 are not so limited, and as is known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or Operating System (OS) 326 operated on by CPU 323. Further, the IHS 320 and its various components and modules may be configured to operate in a manner corresponding to the above described method 100, described herein above in relation to FIG. 1 and its various embodiments.

Figure 4:
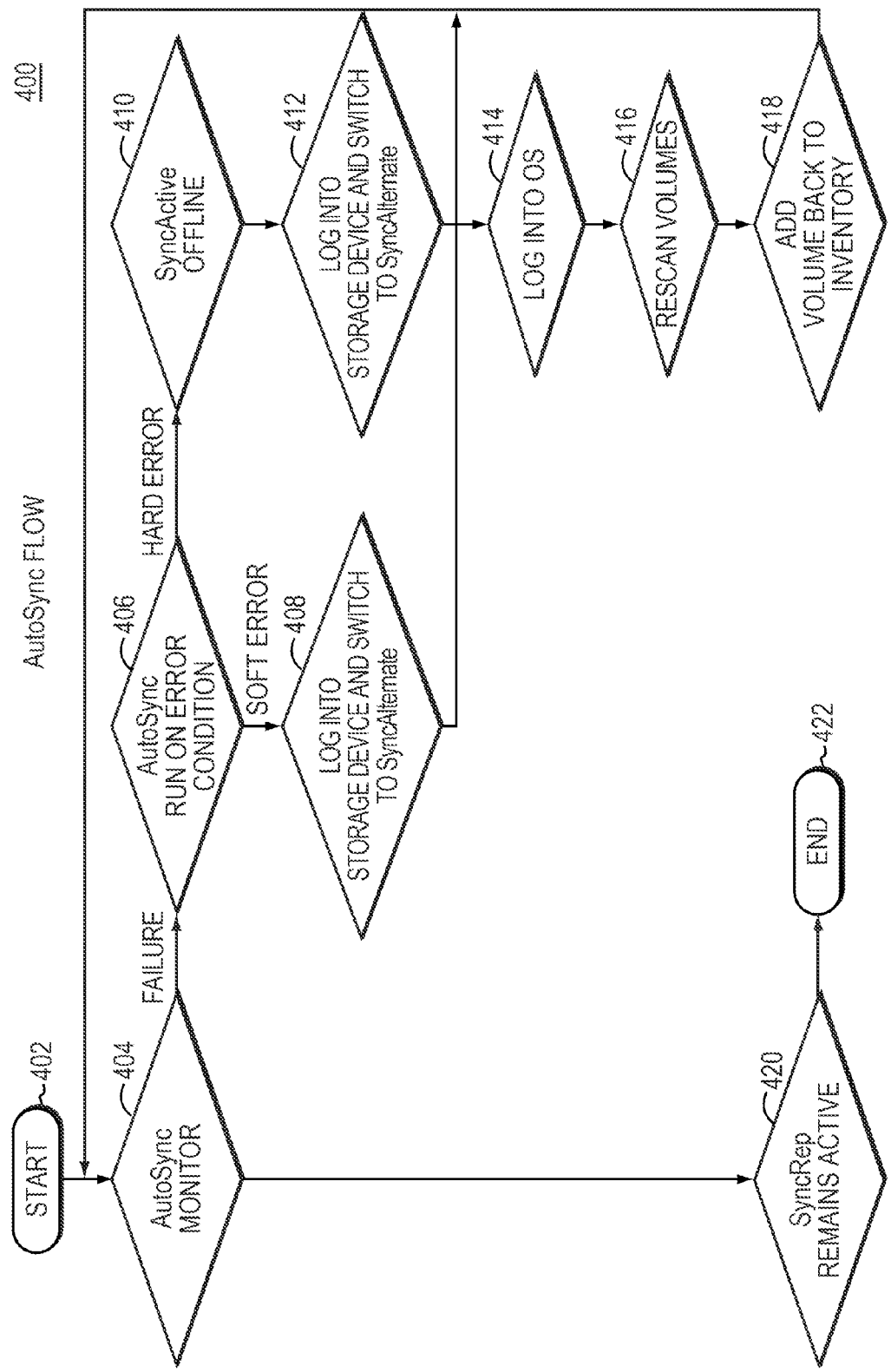
FIG. 4 is a flowchart of a method, according to some embodiments.

FIG. 4 illustrates a flowchart and/or computer-implemented procedure (and system) 400 of some embodiments. In some embodiments, each of steps of the flowchart 400 may be initiated (and/or controlled) by one or more storage devices of the SyncActive volume. Some embodiments may begin 402 by automatically monitoring 404 for one or more failure conditions (including, but not limited to, warnings and/or errors that may include but are not limited to soft errors and/or hard errors). As such, in some embodiments, one or more failure (and/or warning and/or error) indications (and/or conditions) that some embodiments monitor for 404 may include, but are not limited to a soft error, and/or a hard error. Soft errors may include one or more errors that preferably do not take the SyncActive volume offline. Soft errors may include network errors and controller failovers. By contrast with soft errors, hard errors may be more likely to take the SyncActive offline. Some examples of hard errors may include lost blocks and/or disk errors.

In some embodiments, the monitoring 404 and/or handling of one or more failure conditions may be initiated from (and/or at) one or more storage devices of the SyncActive volume (and/or pool). Alternatively, in some embodiments the monitoring 404 and/or handling of the one or more failure conditions may be initiated from (and/or at) one or more storage devices of the SyncAlternate volume (and/or) pool, or at another location, including but not limited to the host.

In some embodiments, if no failures occur while monitoring 404, synchronous replication may remain active 420. If no failures are detected, then some embodiments may optionally stop monitoring 422 based upon one or more user commands and/or a system functions.

While monitoring 404, some embodiments may detect a failure. In some embodiments monitoring 404 for failure detection may be performed at one or more storage devices of the SyncActive volume (and/or pool). In the event that a failure is detected through monitoring 404, some embodiments may analyze 406 the failure to determine whether the failure is a hard error and/or a soft error. In some embodiments, if the analysis 406 detects that a failure is a hard error, then a reactive approach may be taken. In a reactive approach, some embodiments may set the SyncActive volume offline 410 prior to performing a switchover. Then, in some embodiments, one or more storage devices of the SyncActive volume may automatically log into one or more storage devices of the SyncAlternate volume, and perform a switchover to the SyncAlternate volume 412. Next, in some embodiments, the one or more storage devices of the SyncActive volume may automatically log into the operating system 414, rescan one or more volumes 416, and then add the one or more volumes back into the inventory 418. Some embodiments may log onto (and/or access) the operating system 414 which may be located in computer-implemented memory at one or more storage devices of the SyncActive volume, the SyncAlternate volume, one or more switches, the host machine, and/or one or more computing modules accessible across the network.

However, in some embodiments, if the analysis 406 detects that a failure is a soft error, then a proactive approach may be taken. As such, in some embodiments, one or more storage devices of the SyncActive volume may automatically log into one or more storage devices on the SyncAlternate volume and perform a switchover to the SyncAlternate volume 408. The switchover may be seamless. In some embodiments, when a soft error occurs, the host machine may be unaware of the soft error. Therefore, in some embodiments, the one or more storage devices of the SyncActive volume may log into one or more storage devices of the SyncAlternate volume and perform a switchover to the SyncAlternate volume 408 without communication with the host machine. In addition, even after switchover, the host machine may continue to access storage device data and/or have no knowledge that the volumes are switched from the SyncActive volume to the SyncAlternate volume. The host machine may continue to perform write and/or read operations directed to the SyncActive volume, but some embodiments may direct such write and/or read operations to the SyncAlternate volume instead, such that the host machine may have no knowledge of the change of volumes (e.g., a seamless switchover).

Some embodiments may monitor 404 for failures on a periodic basis, including but not limited to monitoring 404 based upon a heartbeat and/or time interval (fixed, configurable, and/or varied). Some embodiments may monitor 404 based upon a periodic time interval that may include but is not limited to sixty seconds, five minutes, and/or a time interval of a programmable number of seconds and/or minutes.

While this disclosure has been particularly shown and described with references to example embodiments thereof, it will be understood by those skilled in the art that various changes in form and details may be made therein without departing from the scope of the disclosure encompassed by the appended claims.

It should be understood that the example embodiments described above may be implemented in many different ways. In some embodiments, the various methods and machines described herein may be implemented by a physical, virtual or hybrid general-purpose computer, or a computer network environment such as the computer network environments 200, 201. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that may be configured to enable a processor to load the software or subsets of instructions thereof. The processor then executes the instructions and may be configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, some embodiments may also be implemented in a variety of computer architectures, physical, virtual, cloud computers, and/or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims. In some embodiments, a warning and/or warning indication may include an error and/or a failure.

What is claimed is:

1. A computer-implemented method for storing data, the method comprising:
providing a first pool of storage having a first plurality of storage devices and an associated first volume;
providing a second pool of storage having a second plurality of storage devices and an associated second volume, data of the first pool of storage corresponding to data of the second pool of storage, the first pool of storage and the second pool of storage not sharing the same controller;
synchronizing, by a storage device of the first plurality of storage devices, the first pool of storage with the second pool of storage;
monitoring, at a storage device of the first plurality of storage devices, each given storage device of the first plurality of storage devices for one or more warning indications including one or more soft errors; and
based on results of the monitoring, automatically taking corrective action, prior to a loss of synchronization event and prior to a failure of the first volume,
wherein the synchronizing includes performing one or more bi-directional acknowledgements between the first pool of storage and the second pool of storage; and
wherein automatically taking corrective action includes replacing the second volume with the first volume, prior to the loss of synchronization event and prior to the failure of the first volume.

2. The computer-implemented method of claim 1, further comprising, based on results of the monitoring, detecting one or more conditions and initiating the automatically taken corrective action based upon a predefined threshold associated with the one or more conditions.

3. The computer-implemented method of claim 1, wherein the one or more warning indications are at least one of: invisible to a user and inaccessible to a user.

4. The computer-implemented method of claim 1, wherein the one or more warning indications include a disk error including a logical block addressing (LBA) error, and zero or more of: a lost block, a port down, a network link error, and a hardware fault.

5. The computer-implemented method of claim 1, wherein the storage device of the first plurality of storage devices monitors for the one or more warning indications in one or more event logs that are associated with each given storage device.

6. The computer-implemented method of claim 1, wherein automatically taking corrective action further includes running a rescan on the second volume, mounting storage devices of the second volume, registering one or more virtual machines (VMs) of the second volume, and powering on one or more virtual machines (VMs) of the second volume.

7. The computer-implemented method of claim 1, wherein replacing the second volume with the first volume includes configuring the second volume using at least one of: a different number of storage devices and a different arrangement of storage devices, as compared with the second volume, without loss of data from the first volume.

8. The computer-implemented method of claim 1, wherein the one or more warning indications include a network link error, and zero or more of: a lost block, a disk error, a port down, and a hardware fault.

9. An information handling system (IHS) comprising:
a data module configured to provide a first pool of storage having a first plurality of storage devices and an associated first volume;
the data module further configured to provide a second pool of storage having a second plurality of storage devices and an associated second volume, data of the first pool of storage corresponding to data of the second pool of storage, the first pool of storage and the second pool of storage not sharing the same controller;
a computing module configured to synchronize, by a storage device of the first plurality of storage devices, the first pool of storage with the second pool of storage;
the computing module further configured to monitor, at a storage device of the first plurality of storage devices, each given storage device of the first plurality of storage devices for one or more warning indications including one or more soft errors; and
the computing module further configured to automatically take corrective action, based on results of the monitoring, prior to a loss of synchronization event and prior to a failure of the first volume,
wherein the computing module is further configured to synchronize including performing one or more bi-directional acknowledgements between the first pool of storage and the second pool of storage;
wherein the computing module is further configured to further automatically taking corrective action including replacing the second volume with the first volume, prior to the loss of synchronization event and prior to the failure of the first volume.

10. The IHS of claim 9, wherein the computing module is further configured, based on results of the monitoring, to detect one or more conditions and initiate the automatically taken corrective action based upon a predefined threshold associated with the one or more conditions.

11. The IHS of claim 9, wherein the one or more warning indications are at least one of: invisible to a user and inaccessible to a user.

12. The IHS of claim 9, wherein the one or more warning indications include a disk error including a logical block addressing (LBA) error, and zero or more of: a lost block, a port down, a network link error, and a hardware fault.

13. The IHS of claim 9, wherein the computing module is further configured to monitor, at the storage device of the first plurality of storage devices, for the one or more warning indications in one or more event logs that are associated with each given storage device.

14. The IHS of claim 9, wherein the computing module is further configured to automatically take corrective action including running a rescan on the second volume, mounting storage devices of the second volume, registering one or more virtual machines (VMs) of the second volume, and powering on one or more virtual machines (VMs) of the second volume.

15. The IHS of claim 11, wherein replacing the second volume with the first volume includes configuring the second volume using at least one of: a different number of storage devices and a different arrangement of storage devices, as compared with the second volume, without loss of data from the first volume.

16. The IHS of claim 9, wherein the one or more warning indications include a network link error, and zero or more of: a lost block, a disk error, a port down, and a hardware fault.

17. A non-transitory computer readable medium having stored thereon a sequence of instructions which, when loaded and executed by a processor coupled to an apparatus, causes the apparatus to:

provide a first pool of storage having a first plurality of storage devices and an associated first volume;

provide a second pool of storage having a second plurality of storage devices and an associated second volume, data of the first pool of storage corresponding to data of the second pool of storage, the first pool of storage and the second pool of storage not sharing the same controller;

synchronize, by a storage device of the first plurality of storage devices, the first pool of storage with the second pool of storage, through one or more bi directional acknowledgements between the first pool of storage and the second pool of storage;

monitor, at a storage device of the first plurality of storage devices, each given storage device of the first plurality of storage devices for one or more warning indications including one or more soft errors; and automatically take corrective action, based on results of the monitoring, prior to a loss of synchronization event and prior to a failure of the first volume; and further automatically taking corrective action including replacing the second volume with the first volume, prior to the loss of synchronization event and prior to the failure of the first volume.

18. The computer-implemented method of claim 1, wherein the one or more warning indications include a lost block, and zero or more of: a disk error, a port down, a network link error, and a hardware fault.

* * * * *